US008019280B2

(12) United States Patent
Tsfaty et al.

(10) Patent No.: US 8,019,280 B2
(45) Date of Patent: Sep. 13, 2011

(54) SYSTEM AND METHOD FOR AVOIDING INTERFERENCE IN A DUAL-SIGNAL DEVICE

(75) Inventors: Yossi Tsfaty, Rishon-Le-Zion (IL); Ran Katz, Givataim (IL); Ran Irony, Hod Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 591 days.

(21) Appl. No.: 12/169,903

(22) Filed: Jul. 9, 2008

(65) Prior Publication Data

US 2009/0017756 A1 Jan. 15, 2009

Related U.S. Application Data

(60) Provisional application No. 60/948,836, filed on Jul. 10, 2007.

(51) Int. Cl.
*H04B 7/00* (2006.01)
(52) U.S. Cl. ...................................... 455/41.2
(58) Field of Classification Search .................. 455/41.2
See application file for complete search history.

(56) References Cited

U.S. PATENT DOCUMENTS

| 6,895,255 B1* | 5/2005 | Bridgelall .................. 455/552.1 |
| 6,978,121 B1 | 12/2005 | Lane et al. | |
| 2002/0012381 A1 | 1/2002 | Mattisson et al. | |
| 2003/0050032 A1 | 3/2003 | Masaki | |
| 2006/0276132 A1 | 12/2006 | Sheng-Fuh et al. | |
| 2007/0232358 A1* | 10/2007 | Sherman ....................... 455/560 |
| 2007/0275746 A1* | 11/2007 | Bitran ............................ 455/509 |
| 2008/0233875 A1* | 9/2008 | Desai et al. .................. 455/41.2 |

FOREIGN PATENT DOCUMENTS

JP  2001-285114 A  10/2001

OTHER PUBLICATIONS

IEEE Std 802.16e—2005 Part 16: Air Interface for Fixed and Mobile Broadband Wireless Access Systems.*
Bluetooth V2.1+EDR (Enhanced Data Rate) [Section 6.19]—2007.*

* cited by examiner

*Primary Examiner* — Temesgh Ghebretinsae
*Assistant Examiner* — David Bilodeau
(74) *Attorney, Agent, or Firm* — John R. Pessetto; W. James Brady; Frederick J. Telecky, Jr.

(57) ABSTRACT

A dual-signal wireless transceiver is provided, comprising: a first wireless transceiver circuit configured to transmit and receive first signals using a first protocol; a second wireless transceiver circuit configured to transmit and receive second signals using a second protocol; and a control circuit configured to generate control signals to control operation of the first and second wireless transceiver circuits, wherein the first wireless transceiver circuit is configured to disable second transmission operations by the second wireless transceiver during first transmission operations by the first wireless transceiver circuit through the use of a shutdown signal. In this method, the second protocol allows the second wireless transceiver to retransmit first signals whose transmission was disabled by the shutdown signal. Furthermore, the second protocol is a Bluetooth protocol, and the first protocol is a wireless protocol other than the Bluetooth protocol.

8 Claims, 6 Drawing Sheets

SYSTEM AND METHOD FOR AVOIDING INTERFERENCE IN A DUAL-SIGNAL DEVICE

CROSS REFERENCE TO RELATED APPLICATION

This application claims priority from, and incorporates herein by reference, U.S. Provisional Application No. 60/948,836 filed on Jul. 10, 2007, entitled "LOW COLLUSION SYNCHRONIZATION SCHEME FOR BT-WIMAX COEXISTENCE."

TECHNICAL FIELD

The present invention relates to the mitigation of interference in dual-signal devices in which signals of two different protocols are used. In particular the present invention relates to the mitigation of interference dual-signal devices that use WiMAX and Bluetooth signal protocols.

BACKGROUND

Currently many different wireless technologies exist that allow for communication over extended distances. A primary example of this can be seen in the numerous cellular communication technologies available. Furthermore, many cell phone handsets contain multiple transceivers. These dual-signal transceivers often have a long-range transceiver for entering into a long-range communications link (e.g., between the cell phone handset and a cellular network), and a short-range transceiver for entering into a short-range communications link (e.g., between the cell phone handset and a wireless headset or earpiece).

However, a signal interference problem can arise in these dual-signal type devices. Despite the fact that the two transmission schemes used in these devices are not the same, and may even be designed not to interfere with each other, there remains the possibility that signals transmitted from the device using a first transmission scheme will nevertheless interfere with signals being received at the device using a second transmission scheme. The reason for this is that a transmitter for the first transmission scheme in the dual-signal device may transmit signals that are strong enough in power, and close enough in proximity, to overwhelm a receiver for the second transmission scheme, regardless of signal type.

Therefore, in dual signal devices it has been necessary to take measures to mitigate the interference caused between the two transceivers in the dual-signal device. One way to achieve interference mitigation is to perform frequency filtering on incoming signals for each transceiver, eliminating frequencies not used by the respective transceivers. If the two transceivers operate at significantly different frequencies, this filtering can prevent interference even when one transceiver is transmitting and the other transceiver is receiving. In such a case, the signals transmitted by the transmitting transceiver will not interfere with the operation of the receiving transceiver, since their frequency components will be largely filtered out of the signals received by the receiving transceiver.

However, this interference mitigation method is not practical when the frequencies used by the two transceivers are sufficiently close that filtering will not be effective. For example, some Worldwide Interoperability for Microwave Access (WiMAX) transceivers operate at 2.3 GHz of 2.5 GHGz, while Bluetooth transceivers operate at frequencies of around 2.4 GHz. These frequencies are close enough that they cannot be effectively separated using filtering.

Another way to mitigate interference is to coordinate the transmission and reception operations of the two co-located transceivers so that they never overlap transmission and reception operations. This can be done using some sort of a coordinated time division multiple access (TDMA) operation. In other words, it schedules each transmitter to operate in a specific and separate time slot.

However, this interference mitigation method may not be practical when two synchronous protocols are used, such as WiMAX and Bluetooth protocols that operate in a voice channel. Such synchronous protocols must maintain continuous streams of data, and may not be able to both split up the available transmission time and also maintain their quality of service requirements.

It would therefore be desirable to provide a way for a dual-signal device that uses transceivers with closely related frequencies (such as WiMAX and Bluetooth) to avoid interference between signal transmissions from the two transceivers.

SUMMARY

Accordingly, a dual-signal wireless transceiver is provided, comprising: a first wireless transceiver circuit configured to transmit and receive first signals using a first protocol; a second wireless transceiver circuit configured to transmit and receive second signals using a second protocol; and a control circuit configured to generate control signals to control operation of the first and second wireless transceiver circuits, wherein the first wireless transceiver circuit is configured to disable second transmission operations by the second wireless transceiver during first transmission operations by the first wireless transceiver circuit through the use of a shutdown signal, wherein the second protocol allows the second wireless transceiver to retransmit first signals whose transmission was disabled by the shutdown signal, wherein the second protocol is a Bluetooth protocol, and wherein the first protocol is a wireless protocol other than the Bluetooth protocol. The first protocol may be a Worldwide Interoperability for Microwave Access (WiMAX) protocol.

When the first and second wireless transceivers are both engaging in active operation, the control circuit may be configured to instruct the first wireless transceiver to transmit and receive using a power save mode of operation, and to instruct the second wireless transceiver to transmit and receive using enhanced data rate mode of operation.

The dual-signal wireless transceiver may be a mobile telephone handset.

A method of operating a dual-signal wireless transceiver may also be provided, comprising: transmitting and receiving first wireless signals via a first local transceiver using a first mode of a first protocol; receiving a first request from a remote transceiver to transmit and receive second wireless signals via a second local transceiver using a first mode of a second protocol, after transmitting and receiving the first wireless signals; transmitting and receiving third wireless signals via the first local transceiver using a second mode of the first protocol after receiving the first request; disabling the second local transceiver from transmitting the second wireless signals while the receiving of the third wireless signals is being performed; and transmitting and receiving the second wireless signals using a second mode of the second protocol, after the transmitting and receiving of the third wireless signals.

The second mode of the second protocol may be the same as the first mode of the second protocol. The first protocol may be a Worldwide Interoperability for Microwave Access (WiMAX) protocol. The second protocol may be a Bluetooth protocol.

The first mode of the first protocol may be a normal mode of operation of the WiMAX protocol, and the second mode of the first protocol may be a power save mode of operation of the WiMAX protocol.

The power save mode of operation of the WiMAX protocol may further involve allocating first, second, third, and fourth contiguous data frames, the first data frame may include a first downlink portion and an unused portion, the second data frame may include an uplink portion and a second downlink portion, and the third and the fourth data frames may be sleep frames. In this case, the first and second frames are sometimes referred to as active frames.

The method may further comprise: sending a rejection message to the remote transceiver rejecting the first connection establishment request; and sending a second request to the remote transceiver to transmit and receive second wireless signals via the second local transceiver using a second mode of the second protocol, after sending the rejection message, wherein the transmitting and receiving of the third wireless signals is performed after sending the second request, and wherein the second mode of the second protocol is different from the first mode of the second protocol.

The first mode of the second protocol may be a first enhanced data rate Bluetooth mode allowing one packet retransmission, and the second mode of the second protocol may be a second enhanced data rate Bluetooth mode allowing two packet retransmissions.

The first and second enhanced data rate modes may each involve repeatedly allocating first through twelfth contiguous data slots, the first data slot may allow transmission of a first packet of data, the second data slot may allow reception of a second packet of data, and the third through twelfth data slots may be empty slots.

At least two of the third through twelfth data slots can be used for retransmission of the first packet of data if the transmission of the first packet of data in the first data slot was not successful.

The dual-signal wireless transceiver may be a mobile telephone handset, and the remote transceiver may be a Bluetooth headset.

A dual-signal wireless transceiver is also provided, comprising: means for transmitting and receiving first wireless signals using a first mode of a first protocol; means for receiving a first request from a remote transceiver to transmit and receive second wireless signals using a first mode of a second protocol, after transmitting and receiving the first wireless signals; means for transmitting and receiving third wireless signals using a second mode of the first protocol after receiving the first request; means for transmitting and receiving the second wireless signals using a second mode of the second protocol, after the transmitting and receiving of the third wireless signals; and means for disabling the means for transmitting the second wireless signals while the means for transmitting and receiving the third wireless signals is receiving the third wireless signal.

The second mode of the second protocol may be the same as the first mode of the second protocol. The first protocol may be a Worldwide Interoperability for Microwave Access (WiMAX) protocol. The second protocol may be a Bluetooth protocol.

The first mode of the first protocol may be a normal mode of operation of the WiMAX protocol, and the second mode of the first protocol may be a power save mode of operation of the WiMAX protocol.

The power save mode of operation of the WiMAX protocol may further involve allocating first, second, third, and fourth contiguous data frames, the first data frame may include a first downlink portion and an unused portion, the second data frame may include an uplink portion and a second downlink portion, and the third and the fourth data frames may be sleep frames.

The dual-signal wireless transceiver may further comprise: means for sending a rejection message to the remote transceiver rejecting the first request; and means for sending a second request to the remote transceiver to transmit and receive second wireless signals using a second mode of the second protocol, wherein the second mode of the second protocol is the same as the first mode of the second protocol.

The first mode of the second protocol may be a first enhanced data rate Bluetooth mode allowing one packet retransmission, and the second mode of the second protocol may be a second enhanced data rate Bluetooth mode allowing two packet retransmissions.

The first and second enhanced data rate modes may each involve repeatedly allocating first through twelfth contiguous data slots, the first data slot may allow transmission of a first packet of data, the second data slot may allow reception of a second packet of data, and wherein the third through twelfth data slots may be empty slots.

At least two of the third through twelfth data slots can be used for retransmission of the first packet of data if the transmission of the first packet of data in the first data slot was not successful.

The dual-signal wireless transceiver may be a mobile telephone handset, and the remote transceiver may be a Bluetooth headset.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

In overview, the present disclosure concerns the mitigation of interference in dual signal devices that contain at least two transceivers within a single device.

This objective of interference mitigation is accomplished by requiring transmission protocols for each transceiver that minimize interference and ensure that even when there is interference, the protocols will recover from the interference. In particular, this is achieved by limiting the times when each transceiver can transmit signals, disabling a first transceiver from transmitting when it would interfere with reception by the second transceiver, and ensuring that the first transceiver has a retransmission scheme that guarantees that the first transceiver will always have an opportunity to retransmit signals whose initial transmission was disabled.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs, along with a variety of memory types. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation, and would be aware of the many types of available computer memory. Therefore, in the interest of brevity and minimization of any risk of obscuring principles and concepts, further discussion of such software, ICs, and memory elements, if any, will be limited to the essentials with respect to the principles and concepts used by the exemplary embodiments.

Dual-Signal Wireless Device

Figure 1:
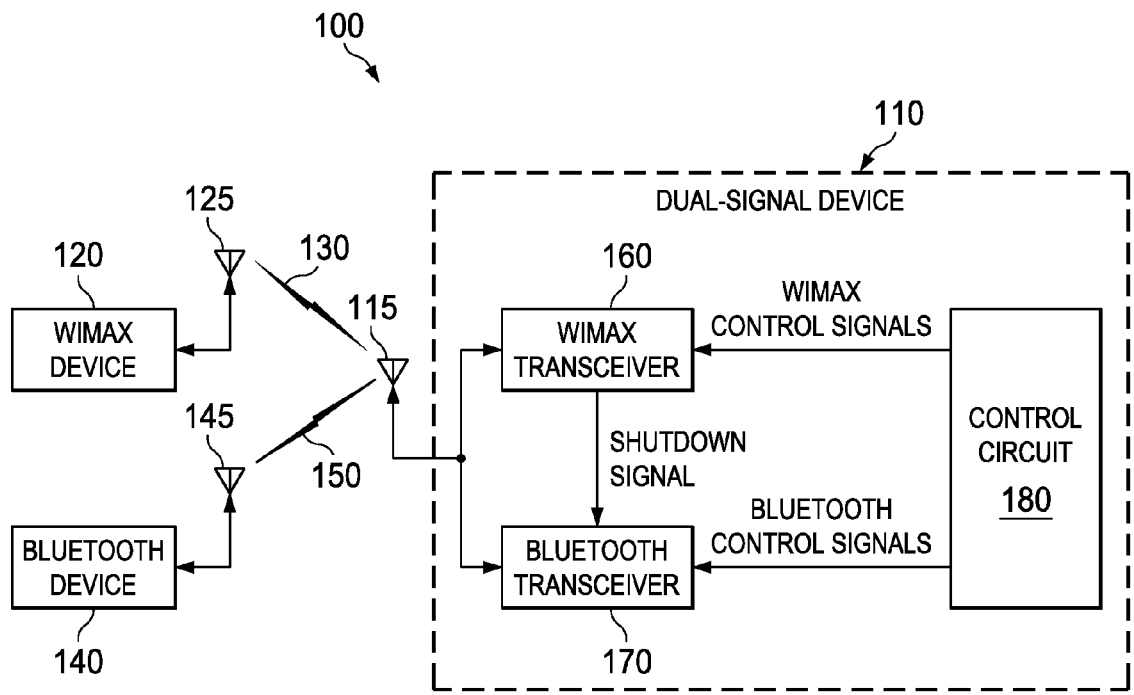
FIG. 1 is diagram of a wireless system including a dual-signal device according to disclosed embodiments.

FIG. 1 is diagram of a wireless system 100 including a dual-signal device according to disclosed embodiments. As shown in FIG. 1, the system includes a dual-signal device 110 using a dual-signal antenna 115, a WiMAX device 120 using a WiMax antenna 125, and a Bluetooth device 140 using a Bluetooth antenna 145. The dual-signal device 110 communicates with the WiMAX device 120 over a WiMAX communications link 130; and the dual-signal device 110 communicates with the Bluetooth device 140 over a Bluetooth communications link 150. The dual-signal device further includes a WiMAX transceiver 160, a Bluetooth transceiver 170, and a controller 180, all co-located on the dual-signal device 110.

The dual-signal device 110 is a wireless communications device that communicates using at least two transmission protocols. In this disclosed embodiment, the dual-signal device uses the WiMAX protocol and the Bluetooth protocol. The dual-signal antenna 115 can be either a single antenna suitable for use with both protocols used, or it may be two separate antennas appropriate to the two transceivers 160, 170.

In particular, the WiMAX transceiver 160 in the dual-signal device 110 connects to the dual-signal antenna 115 and operates to transmit and receive signals over the WiMAX communications link 130 using the WiMAX protocol. Similarly, the Bluetooth transceiver 170 in the dual-signal device 110 connects to the dual-signal antenna 115 and operates to transmit and receive signals over the Bluetooth communications link 150 using the Bluetooth protocol.

The controller 180 generates WiMAX control signals to control the operation of the WiMAX transceiver 160, and generates Bluetooth control signals to control the operation of the Bluetooth transceiver 170.

In addition, in the disclosed embodiment, the WiMAX transceiver 160 can issue a shutdown signal to the Bluetooth transceiver 170. When the shutdown signal is active, it disables the Bluetooth transceiver 170 from transmitting any signals. In this embodiment, however, the shutdown signal operates only at the physical layer, effectively short-circuiting the transmission process. When transmissions by the Bluetooth transceiver 170 are disabled by the shutdown signal, a state machine in the Bluetooth transceiver 170 will believe that these signals were actually transmitted. Of course, since these signals are, in fact, not transmitted, they cannot be acknowledged by a remote Bluetooth device 140. As a result, each of these disabled transmissions will be treated by the Bluetooth transceiver 170 as a failed transmission, rather than a disabled transmission, and therefore eligible for retransmission as allowed by the protocol.

The WiMAX device 120 can be any kind of WiMAX device that might desire to communicate with the dual-signal device 110 using a WiMAX protocol. For example, the WiMAX device 120 could be a remote cell phone, a WiMAX base station, or the like. In some embodiments, the WiMAX device 120 may itself be a dual-signal device, though in such a case it may only communicate with the dual-signal device 110 using the WiMAX communications link 130. The WiMAX antenna 125 is any suitable antenna for transmitting signals using the WiMAX protocol.

The Bluetooth device 140 can be any kind of Bluetooth device that might desire to communicate with the dual-signal device 110 using a Bluetooth protocol. For example, the Bluetooth device 140 could be a wireless headset, a wireless earpiece, a local speaker, or the like. In some embodiments, the Bluetooth device 140 may itself be a dual-signal device, though in such a case it may only communicate with the dual-signal device 110 using the Bluetooth communications link 150. The Bluetooth antenna 145 is any suitable antenna for transmitting signals using the Bluetooth protocol.

Although FIG. 1 is shown as specifically containing a WiMAX device 120, a Bluetooth device 140, and a dual-signal device 110 that uses WiMAX and Bluetooth transceivers 160, 170, the general principles shown in this drawings may be applied to other systems that employ other transmission protocols and other types of transceivers.

Bluetooth Protocol

One allowable mode of Bluetooth operation that is allowed in some versions of the Bluetooth protocol (e.g., Bluetooth 2.0) is an enhanced data rate (EDR) mode of operation that allows the Bluetooth bandwidth to rise to up to 3 Mbits/Second. In particular, the EDR mode of operation uses twelve slots per Bluetooth data frame, one of which is reserved for transmission and one of which is reserved for reception. Furthermore, the EDR mode of operation can allow for multiple retransmission attempts for failed data transmission. For example, the EDR mode in Bluetooth 2.0 can allow for one or two retransmission attempts within each frame, depending upon the connection settings.

Figure 2:
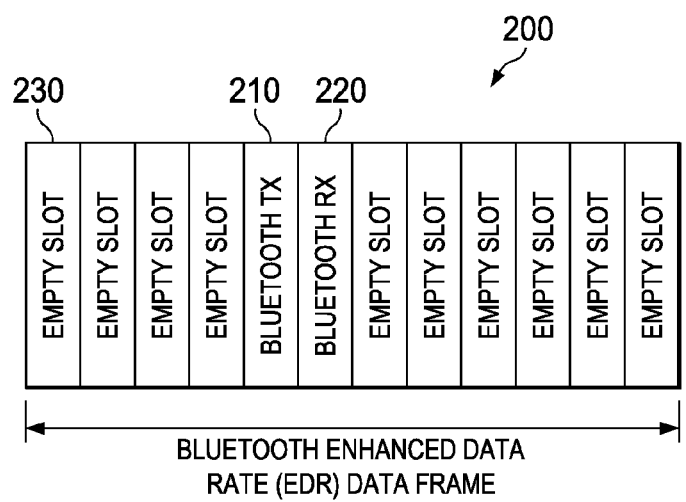
FIG. 2 is a diagram of a Bluetooth enhanced data rate (EDR) data frame according to disclosed embodiments.

FIG. 2 is a diagram of a Bluetooth enhanced data rate (EDR) data frame 200 according to disclosed embodiments. As shown in FIG. 2, the Bluetooth EDR data frame 200 includes twelve slots 210, 220, 230, including one Bluetooth transmission slot 210, one Bluetooth reception slot 220, and ten empty slots 230. In one disclosed embodiment, each Bluetooth slot 210, 220, 230 is 625 microseconds long, giving the Bluetooth EDR data frame 200 a duration of 7.5 milliseconds.

The Bluetooth transmission slot 210 is provided to allow a local Bluetooth transceiver an opportunity to transmit data over a Bluetooth communications link to a remote Bluetooth device. Likewise, the Bluetooth reception slot 220 is provided to allow the local Bluetooth transceiver an opportunity to receive data over a Bluetooth communications link from a remote Bluetooth device.

The empty slots 230 can be used to for retransmission of failed data, if the connection settings allow for retransmission of data, or can be left silent, saving transmit power for the local Bluetooth transceiver The available transmission time in the Bluetooth communications link will then be divided up into a series of repeating EDR data frames 200, which will continue for as long as the Bluetooth communication link is active.

Thus, during this EDR data frame 200, a co-located transceiver could safely transmit or receive data during any of the empty slots 230. Likewise, the co-located transceiver could safely transmit data during the transmission slot 210 or receive data during the reception slot 220. However, if the co-located transceiver transmitted data during the Bluetooth reception slot 220, that transmission could disrupt the reception of Bluetooth data. Likewise, if the co-located transceiver tried to receive data during the Bluetooth transmission slot 220, the transmission of Bluetooth data could disrupt the reception operation of the co-located transceiver.

This means that there is only one slot in the EDR data frame 200 during which transmission by a co-located transceiver would cause interference, and only one slot in the EDR data frame 200 during which reception by a co-located transceiver would suffer from interference. In other words, eleven-twelfths of the EDR data frame 200 is available for safe data transmission by the co-located transceiver, and eleven-twelfths of the EDR data frame 200 is available for safe data reception by the co-located transceiver.

In addition, although in FIG. 2 the Bluetooth transmission slot 210 is shown as being the fifth slot in the EDR data frame 200, and the Bluetooth reception slot 220 is shown as being the sixth slot in the EDR data frame 200, this placement is arbitrary and can be changed in alternate embodiments. In particular, the placement of the Bluetooth transmission slot 210 and the Bluetooth reception slot 220 should be arranged appropriately to allow proper coordination with the transmission to and reception from the remote Bluetooth device that the local Bluetooth device is communicating with.

WiMAX Protocol

One allowable mode of WiMAX operation is a power save mode. During the power save mode, the available transmission time is divided into repeated groups of four frames, including two listen frames and two sleep frames.

Figure 3:
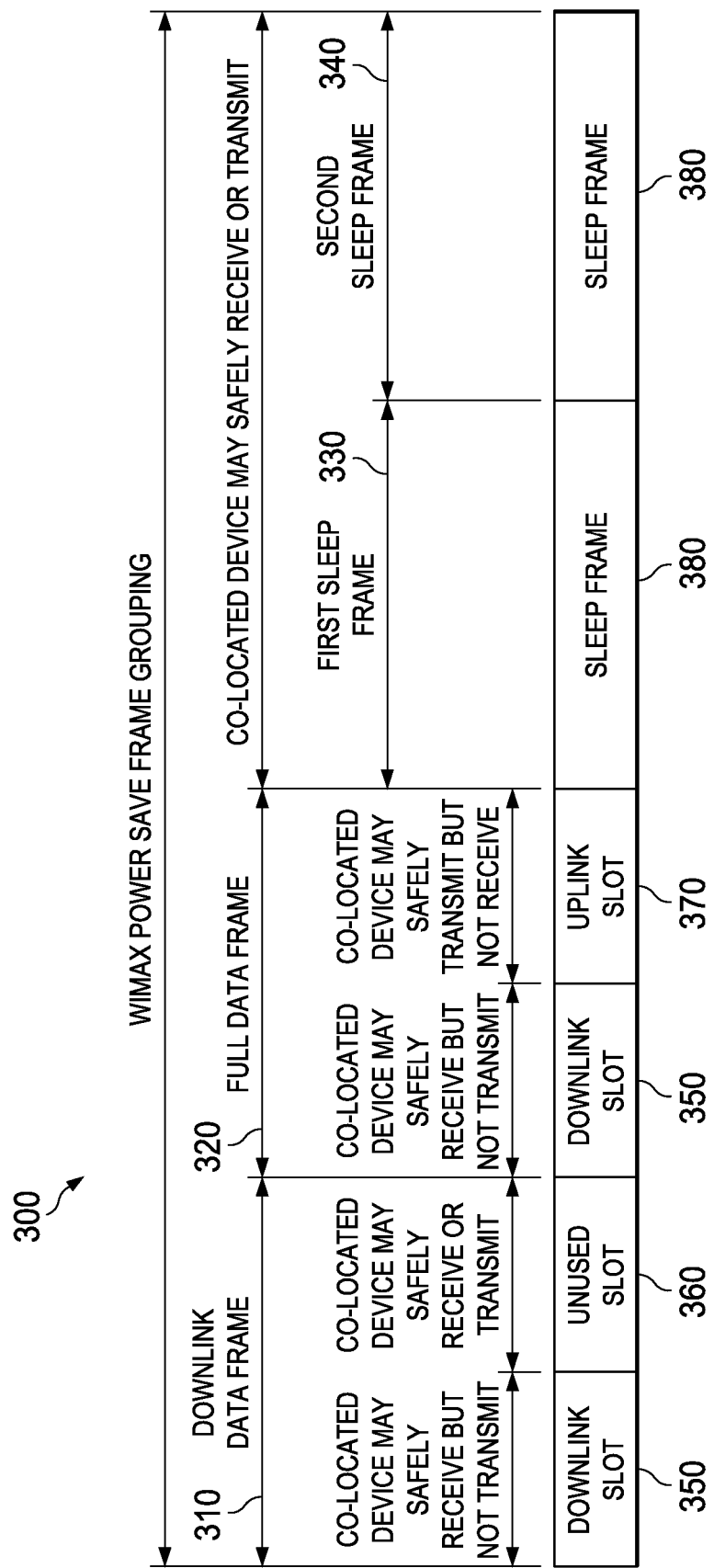
FIG. 3 is a timing diagram of a WiMAX power save frame grouping according to disclosed embodiments.

FIG. 3 is a timing diagram of a WiMAX power save frame grouping 300 according to disclosed embodiments. As noted in FIG. 3, the WiMAX power save frame grouping 300 includes a downlink data frame 310, a fill data frame 320, a first sleep frame 330, and a second sleep frame 340, each of these frames 310, 320, 330, and 340 being the same duration. In one embodiment, that duration is equal to 5 milliseconds.

The downlink data frame 310 is further split into a downlink slot 350 and an unused slot 360. The downlink slot 350 is provided to allow the WiMAX transceiver to receive WiMAX signals from a remote WiMAX device. No transmission or reception of WiMAX signals is performed in the unused slot 360.

The full data frame 320 is split into a downlink slot 350 and an uplink slot 370. The downlink slot 350 is provided to allow the WiMAX transceiver to receive WiMAX signals from a remote WiMAX device. And the uplink slot 370 is provided to allow the WiMAX transceiver to transmit WiMAX signals to the remote WiMAX device.

No transmission or reception of WiMAX signals is performed during the first sleep frame 330 and the second sleep frame 340.

Thus, during a WiMAX power save frame grouping 300, a co-located transceiver could safely transmit or receive data during either of the sleep frames 330, 340, or during the unused slot 360. Likewise, the co-located transceiver can safely receive, but not transmit data during the downlink slots 350, and the co-located transceiver can safely transmit, but not receive data during the uplink slot 370. If the co-located transceiver transmitted data during one of the WiMAX downlink slots 350, that transmission could disrupt the reception of the WiMAX data. Likewise, if the co-located transceiver tried to receive data during the WiMAX uplink slot 370, the transmission of WiMAX data could disrupt the reception operation of the co-located transceiver. In other words, the three-quarters of the WiMAX power save frame grouping 300 is available for data transmission by the co-located transceiver, and seven-eighths of the WiMAX power save frame grouping 300 is available for data reception by the co-located transceiver.

In comparison, a full WiMAX mode of operation would simply employ repeated full data frames 320, allowing the WiMAX transceiver to transmit half the time (during uplink slots) and receive half the time (during downlink slots). In such a case, only half of the WiMAX power save frame grouping 300 would be available for data transmission by the co-located transceiver, and half of the WiMAX power save frame grouping 300 would be available for data reception by the co-located transceiver.

Overlap of WiMAX Protocol and Bluetooth Protocol

As noted above because WiMAX and Bluetooth protocols may use similar frequencies, they cannot use frequency filtering to mitigate interference. Likewise, because both WiMAX and Bluetooth protocols are synchronous protocols, it may not be possible to synchronize their transmission and reception operations to prevent overlap. Furthermore, because the Bluetooth protocol requires a very high quality of service (e.g., less than 1% packet error rate), interference between a Bluetooth transceiver and a WiMAX transceiver may result in very low data throughput.

However, it is possible that by establishing a Bluetooth EDR mode of operation for a Bluetooth transceiver, and establishing a WiMAX power save mode of operation for a co-located WiMAX transceiver, interference can be significantly mitigated. Furthermore, the WiMAX transceiver can then actively disable the Bluetooth transceiver from transmitting when it might interfere with WiMAX reception, eliminating any chance of interference between Bluetooth transmission and WiMAX reception operations. Furthermore, if the retransmission settings for the Bluetooth transceiver are set appropriately, the maximum time during which the Bluetooth transmission may be disabled will not be so long as to prevent retransmission of a piece of Bluetooth data. As a result, an opportunity for full communications can be provided.

Figure 4:
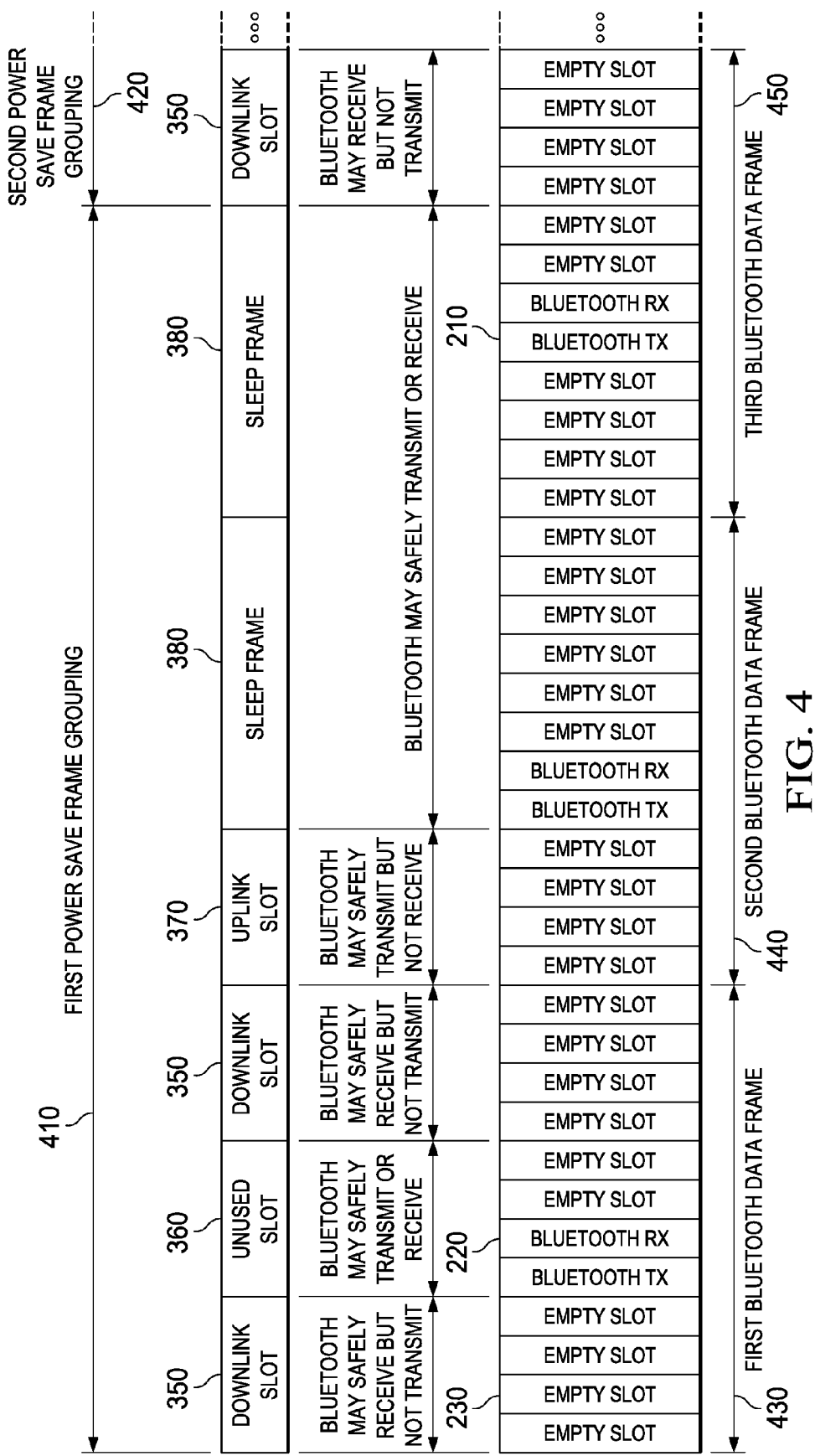
FIG. 4 is a timing diagram of a coordination of a Bluetooth enhanced data frame protocol and a WiMAX power save frame protocol according to disclosed embodiments.
Figure 5:
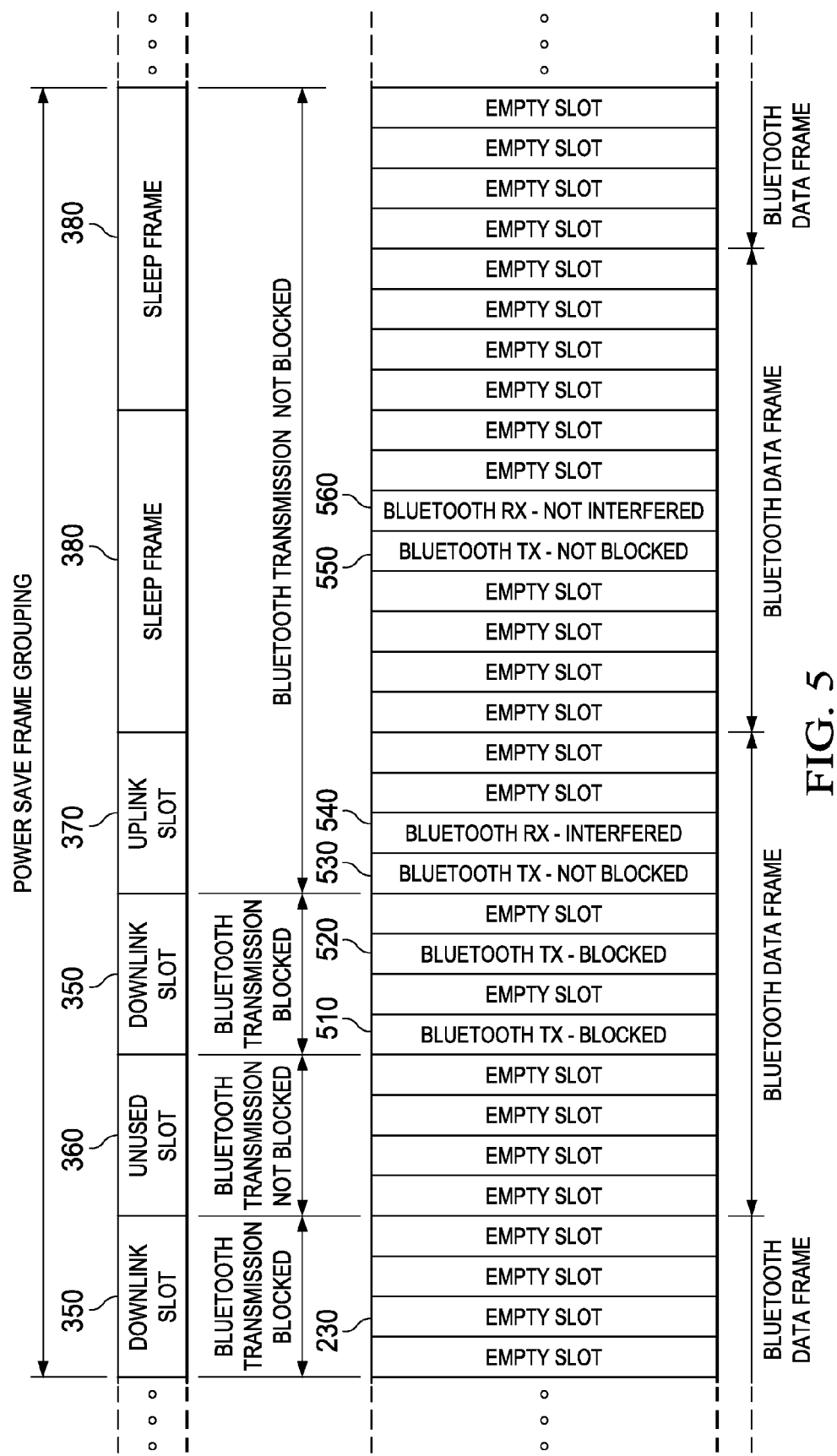
FIG. 5 is a timing diagram of a coordination of a Bluetooth enhanced data frame protocol and a WiMAX power save frame protocol showing interference abatement according to disclosed embodiments.

Exemplary embodiments of how this can be accomplished are shown in FIGS. 4 and 5. FIG. 4 is a timing diagram of a coordination of a Bluetooth enhanced data frame protocol and a WiMAX power save frame protocol according to disclosed embodiments. And FIG. 5 is a timing diagram of a coordination of a Bluetooth enhanced data frame protocol and a WiMAX power save frame protocol showing interference abatement according to disclosed embodiments. These exemplary embodiments use the exemplary frame lengths disclosed above (i.e., each WiMAX frame is 5 milliseconds long, and each Bluetooth frame is 7.5 milliseconds long). Thus, in this embodiment, three WiMAX frames equal two Bluetooth frames.

As shown in FIG. 4, a repeated group of power save frame groupings 410, 420 are arranged for a WiMAX transceiver, while a repeated group of Bluetooth EDR data frames 430, 440, 450 are arranged for a co-located Bluetooth transceiver. In this particular portion of the transmit time, the beginning of the first Bluetooth EDR data frame coincides with the beginning of the first power save frame grouping 410.

FIG. 4 provides a good illustration of the scarcity of collisions in this process. Given that a majority of each WiMAX power save frame grouping 410, 420 allows Bluetooth transmission, a majority of each WiMAX power save frame grouping 410, 420 allows Bluetooth reception, a majority of each Bluetooth EDR data frame 430, 440, 450 allows WiMAX transmission, and a majority of each Bluetooth EDR data frame 430, 440, 450 allows WiMAX transmission, actual collisions between Bluetooth transmission and WiMAX reception, or between WiMAX transmission and Bluetooth reception will not be common. In fact, throughout the operation shown in FIG. 4, no such collisions take place.

All three Bluetooth transmission slots 210 take place during times when the Bluetooth transceiver may safely transmit (e.g., during an unused slot 360 or a sleep frame 380). Likewise, all three WiMAX downlink slots 350 take place when the WiMAX transceiver may freely transmit (e.g., during empty slots 230).

FIG. 5 illustrates a portion of the transmit time during which collisions actually do occur. As shown in FIG. 5, interference with both transmission and reception of Bluetooth signals occur during the disclosed portion of the transmit time.

As noted above, the WiMAX transceiver 160 in the dual-signal device 110 insures that it will not suffer interference by disabling transmission by the Bluetooth transceiver 170 through the use of the shutdown signal whenever the WiMAX transceiver 160 needs to receive a signal (e.g., during a downlink slot 350).

Thus, Bluetooth transmission is blocked by the WiMAX transceiver 160 during both downlink slots 350 disclosed in FIG. 5. This disabling has no practical effect during the first downlink slot 350, since the Bluetooth transceiver 170 has only empty slots 230 during that downlink slot 350.

But the Bluetooth transceiver 170 does have a transmission slot 510 set during the second downlink slot 350. Thus, the Bluetooth transceiver 170 will be disabled from transmitting during its assigned transmission slot 510. However, the Bluetooth transceiver 170 will assume (via its state machine) that it did transmit but that the transmission was a failure. As a result, the Bluetooth transceiver 170 will try to retransmit the data two slots after the originally assigned transmission slot 510 in a first retransmission slot 520. This second transmission slot 520 will also occur during the time during which transmission by the Bluetooth transceiver 170 is disabled, since it is still during the downlink slot 350. Once more the transmission will be disabled. And once more the Bluetooth transceiver 170 will think (through its state machine) that the transmission was made, but failed.

As a result, the Bluetooth transceiver 170 will make its second allowable retransmission attempt in a second retransmission slot 530. This time, however, because the Bluetooth transceiver had to wait through four Bluetooth slots for the second retransmission (or 2.5 milliseconds—the same duration as that of the downlink slot 350), the second retransmission slot 530 will be guaranteed to be free of the downlink slot 350, and will not be disabled. This will ultimately allow the data to be transmitted to the remote Bluetooth device.

Thus, by allowing two retransmission attempts in this embodiment, the system guarantees a delay before the last retransmission attempt that is equal to the length of the longest possible blocked period (i.e., 5 milliseconds in the disclosed embodiments). As a result, the Bluetooth transceiver will always be guaranteed at least one valid transmission attempt for every assigned transmission slot.

FIG. 5 also shows that a Bluetooth receiving slot 540 occurs during the WiMAX uplink slot 370. As a result, the Bluetooth receiving slot 540 will suffer interference from a WiMAX transmission, and may not be successful. However, the dual-signal device is not itself concerned with this failure. Rather, the remote Bluetooth device must deal with the failure through its own retransmission attempts. However, for reasons analogous to those given above for the retransmission by the dual-signal device, the fact that there are two allowable retransmission attempts means that no matter where the interfered Bluetooth receiving slot 540 falls, the remote Bluetooth device will always have at least one retransmission attempt that falls outside of the duration of the uplink slot 370.

Furthermore, as FIG. 5 shows, the later Bluetooth transmission slot 550 and Bluetooth receiving slot 560 fall within a WiMAX sleep frame 380, again illustrating that transmit/receive collisions are not common.

Method of Connecting a Dual Signal Device and a Bluetooth Device

As shown above, signal interference can be mitigated between co-located WiMAX and Bluetooth transceivers if: (1) the WiMAX transceiver is set to use a power save mode; (2) the Bluetooth transceiver is set to use an EDR mode; (3) the WiMAX transceiver is configured to disable transmission by the Bluetooth transceiver whenever the WiMAX transceiver performs a receiving operation; and (4) the Bluetooth transceiver is set to allow at least two retransmission attempts.

The first three requirements are relatively easy to meet. However, the fourth requirement runs into a difficulty in that for Bluetooth version 2.0, the default retransmission allowance is one retransmission. Furthermore, when a Bluetooth communication link is established, it is the device requesting the establishment of the link that sets the number of retransmission attempts. And most devices particularly non-dual Bluetooth devices) will only request a retransmission allowance of one retransmission.

But based on the above analysis, a retransmission allowance of two retransmissions is required to insure that a Bluetooth transmission will always have an opportunity to be retransmitted, even in the worst case of transmission disabling. Absent this double retransmission allowance, collision avoidance cannot be guaranteed.

One solution to this difficulty is to make sure that the dual-signal device is always the device that establishes the Bluetooth communications link. Then the dual-signal device can make certain that it always requests that two retransmission attempts be allowed. To accomplish this, the dual-signal device can be configured such that whenever it receives a request to establish a Bluetooth communications link from a remote Bluetooth device, it either checks the transmission parameters and only accepts requests with appropriate parameters, requesting its own connection where the requested parameters are not appropriate, or it routinely refuses all requests, but then immediately follows up with a request to the remote Bluetooth device establish a communications link with desirable parameters. The end result will be the same, i.e., the establishment of a Bluetooth communications link between the two devices. However, by engaging in this process, the communications link will be guaranteed to be set to have two retransmission attempts allowed, since it is always the dual-signals device that makes the establishment request.

Figure 6:
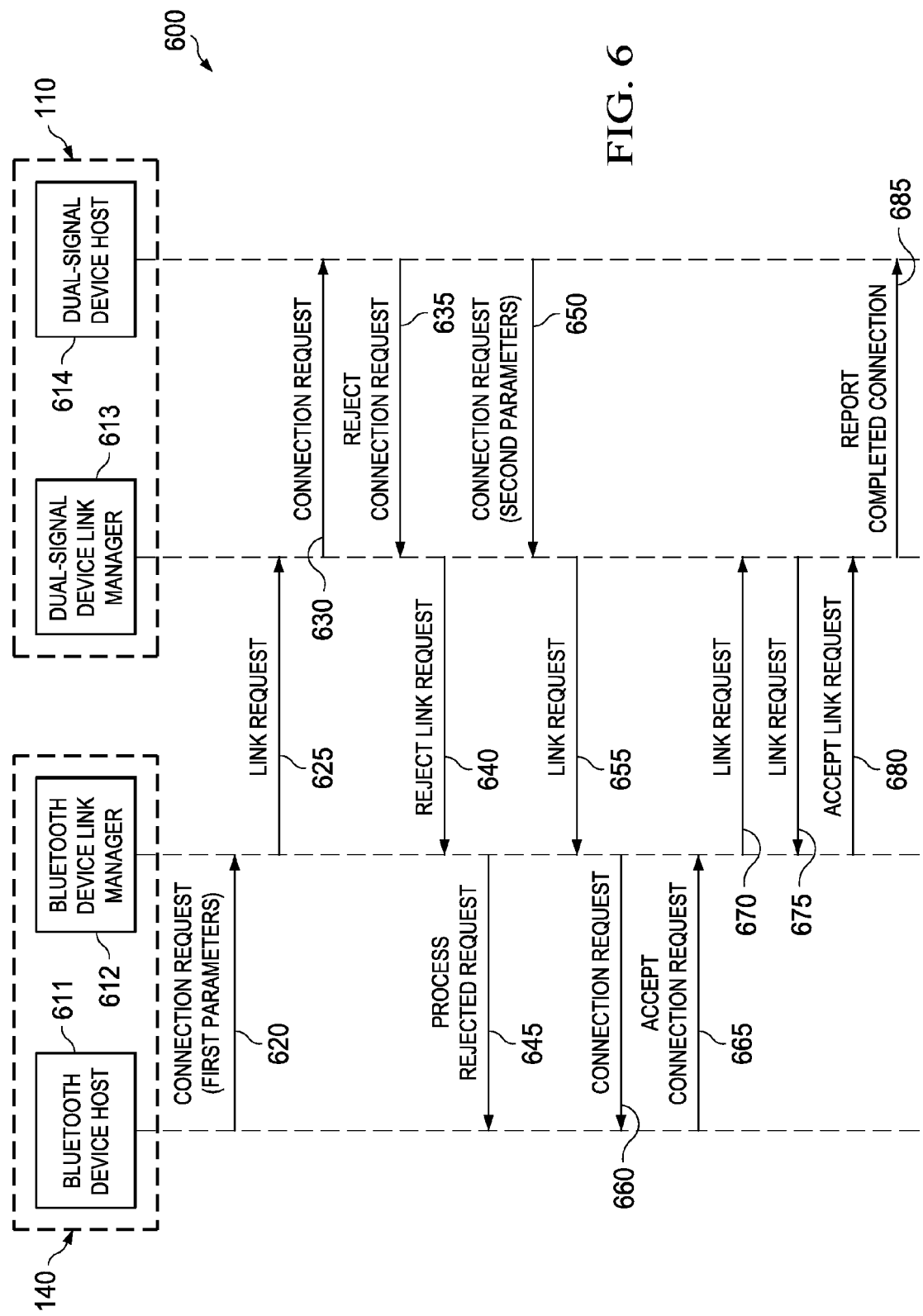
FIG. 6 is a diagram showing the timing of a connection request between a dual-signal device and a Bluetooth device according to disclosed embodiments.
Figure 7:
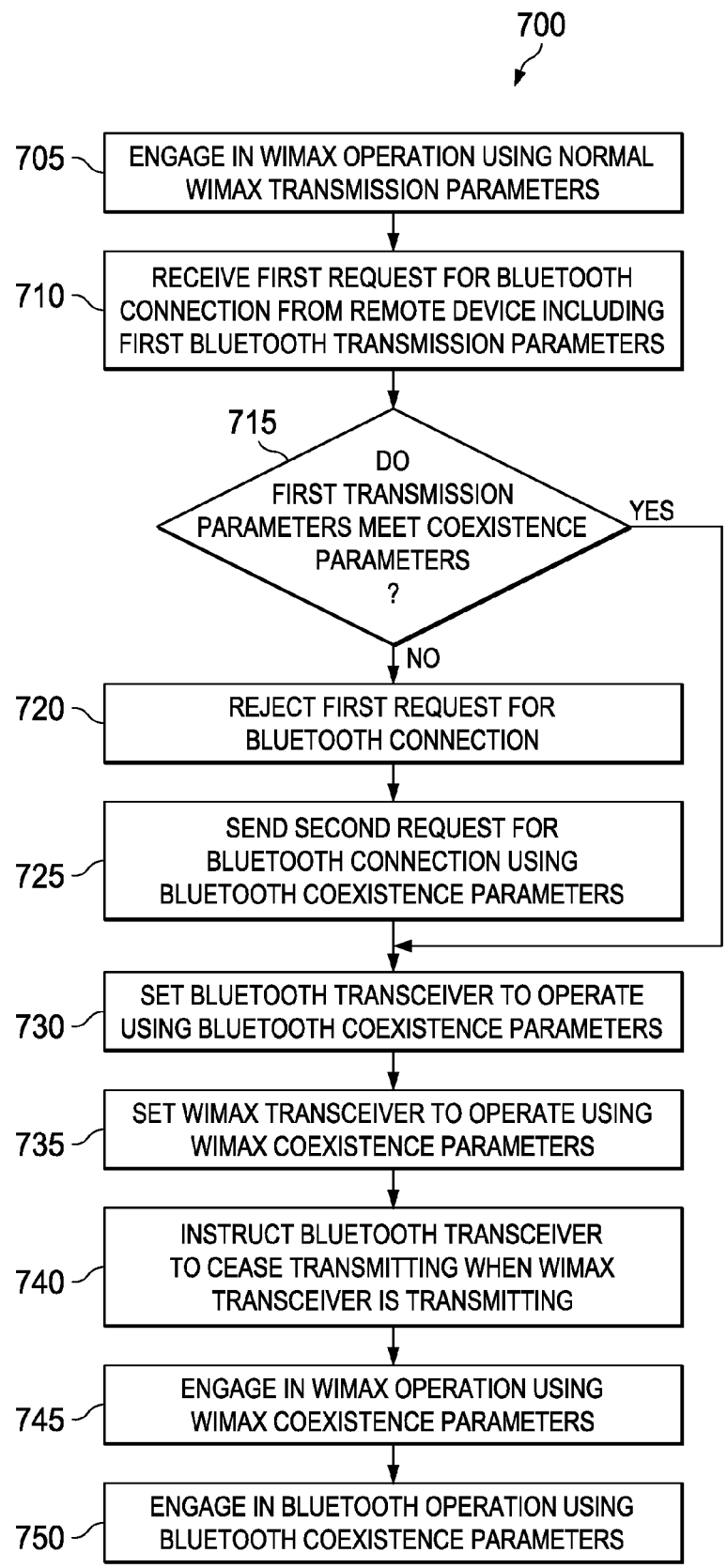
FIG. 7 is a flow chart showing a method of establishing a connection between a dual-signal device and a Bluetooth device according to disclosed embodiments.

FIG. 6 is a diagram showing the timing of a connection request between a dual-signal device and a Bluetooth device according to disclosed embodiments, while FIG. 7 is a flow chart showing a method of establishing a connection between a dual-signal device and a Bluetooth device according to disclosed embodiments. In particular, FIG. 6 shows the signal operation between a Bluetooth device including a Bluetooth device host 611 and a Bluetooth device link manager 612, and a dual-signal device 110 including a dual-signal device link manager 613, and a dual-signal device host 614.

As shown in FIG. 7, the process begins when a dual-signal device 110 engages in WiMAX operations using normal WiMAX transmission parameters (705).

The dual-signal device 110 then receives a first request for a Bluetooth connection from a remote Bluetooth device 140 including first Bluetooth transmission parameters (710).

Upon receiving the first request for Bluetooth transmission, the dual-signal device 110 determines whether the first transmission parameters meet Bluetooth coexistence parameters that will allow successful coexistence (i.e., existence without fatal interference) between the two co-located transceivers (715). For example, in the embodiments disclosed above, the Bluetooth coexistence parameters include operating in an EDR more in which at least two retransmission attempts are allowable for each EDR frame. Alternate embodiments can require different Bluetooth coexistence parameters. For example, if a later Bluetooth version allows more than two possible retransmissions, the Bluetooth coexistence parameters may require more than two allowable retransmission attempts. Other variations are also possible.

If the first transmission parameters do not meet the Bluetooth coexistence parameters, then the dual-signal device rejects the first request for Bluetooth connection (720) and then sends a second request for Bluetooth connection using the Bluetooth coexistence parameters (725). It then sets the Bluetooth transceiver to operate using the Bluetooth coexistence parameters (730), which were contained in the second request for Bluetooth connection.

If the first transmission parameters do meet the Bluetooth coexistence parameters, however, then the dual-signal device simply accepts the first request for Bluetooth connection and sets the Bluetooth transceiver to operate using the Bluetooth coexistence parameters (730), which were contained in the first request for Bluetooth connection.

Thus, regardless of whether the first request for Bluetooth connection met the Bluetooth coexistence parameters or not, the Bluetooth transceiver will ultimately be set to operate using the desired Bluetooth coexistence parameters (730).

Once the Bluetooth transceiver is set to operate using the desired Bluetooth coexistence parameters, the dual-signal device then sets the WiMAX transceiver to operate using the desired WiMAX coexistence parameters (735). In the disclosed embodiment these parameters include operating in a power save mode. Alternate embodiments can use different WiMAX coexistence parameters as needed.

The dual-signal device then instructs the Bluetooth transceiver to cease transmitting when the WiMAX circuit is transmitting (740). It should be noted that although this operation is disclosed in FIG. 7 as being a single operation, it simply represents setting the WiMAX transceiver to disable Bluetooth transmission operations in the Bluetooth transceiver during WiMAX receiving operations in the WiMAX transceiver. This operation will thus be performed repeatedly during WiMAX operation, as needed.

Finally, once all of the necessary transmission parameters are set for mitigation of interference, the dual-signal device engages in WiMAX operation using the WiMAX coexistence parameters (745), and engages in Bluetooth operations using Bluetooth coexistence parameters (750).

As discussed above, this will ensure that no signal interference will prevent the transmission of any data in the overall system. In the first place, the two frame structures are sparse enough that overlapping transmission and reception times will not be common. In the second place, the WiMAX transceiver is configured to disable any potential interference with its receiving operations without destroying the Bluetooth connection. And in the third place, even when WiMAX transmission/Bluetooth reception collisions do occur, the connection parameters are set to insure proper data transmission.

If the WiMAX transceiver transmit signals when the Bluetooth transceiver is receiving signals, then those signals are likely to fail. But the remote Bluetooth device is has two retry attempts allowed. And the WiMAX transmission time will not be so long as to overlap both the initial reception slot and both retransmission slots.

Furthermore, if the Bluetooth transceiver is set to transmit during a WiMAX receiving (i.e., downlink) operation, then the Bluetooth transceiver will be disabled during the entire WiMAX receiving operation. But since there are two retransmission attempts allowed, there will always be time left after the WiMAX receiving operation for the Bluetooth data to be sent, even in a worse case situation.

In addition, while FIG. 7 discloses that the dual-signal device determines whether the first transmission parameters meet the coexistence parameters (715), alternate embodiments could eliminate this operation for the sake of simplicity. In this case, the dual-signal device would always reject a request for Bluetooth connection, regardless of the Bluetooth transmission parameters contained in the request. Then, the dual-signal device would always sent its own request (725), thereby insuring that the desired Bluetooth coexistence parameters were met for the resulting connection.

FIG. 6 shows exemplary signal traffic in the case where the dual-signal device 110 determines that the first transmission parameters do not meet the coexistence parameters (715). As shown in FIG. 6, the exemplary communication link connection process begins with a connection request 620 including the first parameters being provided from the Bluetooth device host 611 to the Bluetooth device link manager 612. This connection request 620 is then followed by a subsequent link request 625 being provided from the Bluetooth device link manager 612 to the dual-signal device link manager 613, also including the first parameters, and a connection request 630 being provided from a the dual-signal device link manager 613 to the dual-signal device host 614, also including the first parameters.

In this case, the first parameters do not meet the Bluetooth coexistence parameters, so the dual-signal host sends a rejection of the connection request 635 from the dual-signal device host 614 to the dual-signal device link manager 613, which is then passed on as a link request rejection 640 from the dual-signal device link manager 613 to the Bluetooth device link manager 612, which then sends a signal to process the rejected request 645 to the Bluetooth device host 611.

The dual-signal device host 614 then responds with a connection request 650 containing second parameters that meet the Bluetooth coexistence parameters. This connection request 650 is then followed by a subsequent link request 655 being provided from the dual-signal device link manager 613 to the Bluetooth device link manager 612, also including the second parameters, and a connection request 660 being provided from the Bluetooth device link manager 612 to the Bluetooth device host 611, also including the second parameters.

The Bluetooth device host 611 then sends a signal to the Bluetooth device link manager 612 to accept the connection request 665. The Bluetooth device link manager 612 then sends a subsequent link request 670 to the dual-signal device link manager 613 based on the link request 655, and the dual-signal device link manager 613 replies to the Bluetooth device link manager 612 with yet another link request 675.

Finally, the Bluetooth device link manager 612 sends one last link request 680 to the dual-signal device link manager 613 to confirm the connection, and the Bluetooth device link manager 612 sends a subsequent link request 670 to the dual-signal device link manager 613 to report the completed connection 685 to the dual-signal device host 614. At this point, the Bluetooth connection is established, and it is established using the desired parameters.

In this way, the dual-signal device 110 is guaranteed to get a proper Bluetooth connection, regardless of what parameters a remote Bluetooth device uses when it initiates a connection request.

CONCLUSION

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed:

1. A method of operating a dual-signal wireless transceiver, comprising:
   transmitting and receiving first wireless signals via a first local transceiver using a first mode of a first protocol;
   receiving a first request from a remote transceiver to transmit and receive second wireless signals via a second local transceiver using a first mode of a second protocol, after transmitting and receiving the first wireless signals;
   transmitting and receiving third wireless signals via the first local transceiver using a second mode of the first protocol after receiving the first request;
   disabling the second local transceiver from transmitting the second wireless signals while the receiving of the third wireless signals is being performed; and
   transmitting and receiving the second wireless signals using a second mode of the second protocol, after the transmitting and receiving of the third wireless signals;
   wherein the first protocol is a Worldwide Interoperability for Microwave Access (WiMAX) protocol;
   wherein the first mode of the first protocol is a normal mode of operation of the WiMAX protocol;
   wherein the second mode of the first protocol is a power save mode of operation of the WiMAX protocol;
   wherein the power save mode of operation of the WiMAX protocol further involves allocating first, second, third, and fourth contiguous data frames,
   wherein the first data frame includes a first downlink portion and an unused portion,
   wherein the second data frame includes an uplink portion and a second downlink portion, and
   wherein the third and the fourth data frames are sleep frames.

2. A method of operating a dual-signal wireless transceiver, comprising:
   transmitting and receiving first wireless signals via a first local transceiver using a first mode of a first protocol;
   receiving a first request from a remote transceiver to transmit and receive second wireless signals via a second local transceiver using a first mode of a second protocol, after transmitting and receiving the first wireless signals;
   transmitting and receiving third wireless signals via the first local transceiver using a second mode of the first protocol after receiving the first request;
   disabling the second local transceiver from transmitting the second wireless signals while the receiving of the third wireless signals is being performed; and
   transmitting and receiving the second wireless signals using a second mode of the second protocol, after the transmitting and receiving of the third wireless signals;
   sending a rejection message to the remote transceiver rejecting the first request; and
   sending a second request to the remote transceiver to transmit and receive second wireless signals via the second local transceiver using a second mode of the second protocol, after sending the rejection message,
   wherein the transmitting and receiving of the third wireless signals is performed after sending the second request;
   wherein the second mode of the second protocol is different from the first mode of the second protocol;
   wherein the first mode of the second protocol is a first enhanced data rate Bluetooth mode allowing one packet retransmission, and
   wherein the second mode of the second protocol is a second enhanced data rate Bluetooth mode allowing two packet retransmissions.

3. The method of claim 2, wherein the first and second enhanced data rate modes each involve repeatedly allocating first through twelfth contiguous data slots,
   wherein the first data slot allows transmission of a first packet of data,
   wherein the second data slot allows reception of a second packet of data, and
   wherein the third through twelfth data slots are empty slots.

4. The method of claim 3, wherein at least two of the third through twelfth data slots can be used for retransmission of the first packet of data if the transmission of the first packet of data in the first data slot was not successful.

5. A dual-signal wireless transceiver, comprising:
means for transmitting and receiving first wireless signals using a first mode of a first protocol;
means for receiving a first request from a remote transceiver to transmit and receive second wireless signals using a first mode of a second protocol, after transmitting and receiving the first wireless signals;
means for transmitting and receiving third wireless signals using a second mode of the first protocol after receiving the first request;
means for transmitting and receiving the second wireless signals using a second mode of the second protocol, after the transmitting and receiving of the third wireless signals; and
means for disabling the means for transmitting the second wireless signals while the means for transmitting and receiving the third wireless signals is receiving the third wireless signal;
wherein the first protocol is a Worldwide Interoperability for Microwave Access (WiMAX) protocol;
wherein the first mode of the first protocol is a normal mode of operation of the WiMAX protocol;
wherein the second mode of the first protocol is a power save mode of operation of the WiMAX protocol;
wherein the power save mode of operation of the WiMAX protocol further involves allocating first, second, third, and fourth contiguous data frames,
wherein the first data frame includes a first downlink portion and an unused portion,
wherein the second data frame includes an uplink portion and a second downlink portion, and
wherein the third and the fourth data frames are sleep frames.

6. A dual-signal wireless transceiver, comprising:
means for transmitting and receiving first wireless signals using a first mode of a first protocol;
means for receiving a first request from a remote transceiver to transmit and receive second wireless signals using a first mode of a second protocol, after transmitting and receiving the first wireless signals;
means for transmitting and receiving third wireless signals using a second mode of the first protocol after receiving the first request;
means for transmitting and receiving the second wireless signals using a second mode of the second protocol, after the transmitting and receiving of the third wireless signals; and
means for disabling the means for transmitting the second wireless signals while the means for transmitting and receiving the third wireless signals is receiving the third wireless signal;
means for sending a rejection message to the remote transceiver rejecting the first request; and
means for sending a second request to the remote transceiver to transmit and receive second wireless signals using a second mode of the second protocol,
wherein the second mode of the second protocol is the same as the first mode of the second protocol;
wherein the first mode of the second protocol is a first enhanced data rate Bluetooth mode allowing one packet retransmission, and
wherein the second mode of the second protocol is a second enhanced data rate Bluetooth mode allowing two packet retransmissions.

7. The dual-signal wireless transceiver of claim 6, wherein the first and second enhanced data rate modes each involve repeatedly allocating first through twelfth contiguous data slots,
wherein the first data slot allows transmission of a first packet of data,
wherein the second data slot allows reception of a second packet of data, and
wherein the third through twelfth data slots are empty slots.

8. The dual-signal wireless transceiver of claim 7, wherein at least two of the third through twelfth data slots can be used for retransmission of the first packet of data if the transmission of the first packet of data in the first data slot was not successful.

* * * * *